3,148,203
ORGANIC CARBONATE ESTERS
Robert M. Schisla and Van R. Gaertner, Dayton, Ohio, assignors to Monsanto Company, a corporation of Delaware
No Drawing. Filed Nov. 22, 1960, Ser. No. 70,922
7 Claims. (Cl. 260—463)

This invention relates to organic carbonate esters. In one respect this invention relates to glycol biscarbonates of halogenated phenols. In another respect, this invention relates to methods for preparing biscarbonates of halogenated toxicant compositions containing at least one glycol biscarbonate of a halogenated phenol as an essential active ingredient. In another aspect, this invention relates to methods of controlling biological pests by the application of biological toxicant compositions containing a glycol bis(chlorophenyl carbonate).

Numerous glycol biscarbonate compounds are known to exist and to have commercial value in a great variety of useful applications. For example, glycol ether bis(aliphatic carbonate) compounds have been found useful as paint thinners, as hydraulic fluids, and as resin plasticizers.

It has now been discovered, according to this invention, that new biscarbonates are formed when glycol bis(chloroformates) are reacted with halogenated phenols, and that such compounds are useful for controlling biological pests.

An object of this invention is to provide new glycol bis(halophenyl carbonates).

Another object of this invention is to provide methods for reacting halogenated phenols with glycol bis(chloroformates).

Another object of this invention is to provide biological toxicant compositions containing glycol bis(halophenyl carbonates) as an essential active ingredient.

Another object of this invention is to provide methods for controlling biological pests by the application of a biological toxicant composition containing a glycol bis(halophenyl carbonate) as an essential active ingredient.

Other aspects, objects, and advantages of this invention are apparent from a consideration of the accompanying disclosure and the appended claims.

According to the present invention, there are provided methods whereby a halogenated phenol, preferably a chlorine-substituted phenol, is reacted with a bis(chloroformate) of the formula

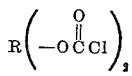

wherein R is a bivalent radical selected from the group consisting of alkylene radicals having from 2 to 6 carbon atoms, alkylene-oxy-alkylene-radicals having from 2 to 4 carbon atoms in each alkylene group, and polyalkylene-oxy-alkylene-radicals having from 3 to 10 alkylene groups and from 2 to 4 carbon atoms in each alkylene group, in the presence of an acid acceptor.

Further, according to the present invention, there are provided as new compounds, bis(halophenyl carbonates) of the formula

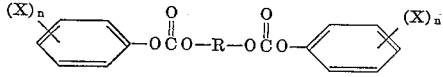

wherein X is a halogen, preferably chlorine, n is a whole number of from 1 to 5, and R is as defined above, simple examples of such compounds being: ethylene glycol bis-2,4,5-trichlorophenyl carbonate), diethylene glycol bis-(pentachlorophenyl carbonate) and tripropylene glycol bis(tetrachlorophenyl carbonate).

Further, according to the present invention, there are provided biological toxicant compositions comprising a carrier adjuvant and, as an essential active ingredient, a toxic amount of at least one of the above defined bis(halophenyl carbonate) compounds.

Further, according to this invention, there are provided methods for controlling biological pests by the application of said above-defined biological toxicant compositions.

Bis(chloroformates) employed in the reaction of this invention are those derived from reaction of phosgene with a glycol selected from the group consisting of an alkylene glycol having from 2 to 6 carbon atoms in the alkylene group, and alkylene-oxy-alkylene glycol having from 2 to 4 carbon atoms in each alkylene group, and a polyalkylene-oxy-alkylene glycol having from 3 to 10 alkylene groups and from 2 to 4 carbon atoms in each alkylene group, according to conventional procedures, for example, as described in U.S. Patent 2,873,291.

Illustrative examples of bis(chloroformates) compounds derived from alkylene glycols include: ethylene glycol bis(chloroformate), 1,2-propylene glycol bis(chloroformate), 1,3-propylene glycol bis(chloroformate), 1,2-butylene glycol bis(chloroformate), 1,3-butylene glycol bis(chloroformate), 1,4-butylene glycol bis(chloroformate), 1,5-pentylene glycol bis(chloroformate), and 1,6-hexylene glycol bis(chloroformate).

Illustrative examples of bis(chloroformate) compounds derived from the reaction of phosgene with alkylene-oxy-alkylene glycols include the following: diethylene glycol bis(chloroformate), 2,2'-dipropylene glycol bis(chloroformate), 3,3'-dipropylene glycol bis(chloroformate), 4,4'-dibutylene glycol bis(chloroformate).

Illustrative examples of polyalkylene-oxy-alkylene bis-(chloroformates) used as reactants in the present invention are as follows:

Tetraethylene glycol bis(chloroformate, tetrapropylene glycol bis(chloroformate), tetraethylene glycol bis-(chloroformate).

Triethylene glycol bis(chloroformate), tripropylene glycol bis(chloroformate), tributylene glycol bis(chloroformate);

Pentaethylene glycol bis(chloroformate), pentapropylene glycol bis(chloroformate), pentabutylene glycol bis-(chloroformate);

Hexaethylene glycol bis(chloroformate), hexapropylene glycol bis(chloroformate), hexapropylene glycol bis-chloroformate).

Similarly, bis(chloroformates) derived from phosgene and polyalkylene-oxy-alkylene glycols having up to about 10 alkylene groups and from 2 to 4 carbon atoms in each alkylene group may be used, examples of such compounds are: decaethylene glycol bis(chloroformate), decaproylene glycol bis(chloroformate), and decabutylene glycol bis(chloroformate).

The halogenated phenol compounds employed in the reaction of this invention can be a phenol having from 1 to 5 halogen atoms, preferably chlorine on the phenyl ring. Those phenols having from 3 to 5 chlorine atoms on the phenyl ring being preferred for biological toxicant purposes.

Reaction of the halophenol with the bis(chloroformate) compound is generally exothermic so that this reaction is normally conducted in an inert solvent medium under carefully controlled temperature conditions. In general, a temperature within the range of from −10 to 50° C. is used and preferably the temperature is maintained within the range of from 0° C. to 20° C. Tertiary amines, such as dimethylaniline, and pyridine are examples of preferred solvents, although other solvents such as toluene, benzene, hexane, etc. can also be used if an acid acceptor substance is used therewith in stoichiometric amounts. In this reaction, generally stoichiometric quantities of the reactants, that is, 2 moles of the halogenated phenol to 1 mole of the bis(chloroformate) compound are used.

The reaction of this invention is normally conducted by either dissolving or suspending the selected halogenated phenol in the appropriate reaction solvent, pyridine being suitable, and adding the bis(chloroformate) compound slowly under constant agitation and carefully controlled temperature conditions involving removing the exothermic heat of reaction. The completion of the reaction can be readily determined by observing the cessation of a slight temperature rise upon continued addition of haloformate or the amount of by-product produced. When the required amount of the bis(chloroformate) compound has been added, the mixture is allowed to set several hours, suitably overnight, with stirring, after which the solvent is removed using a water aspirator with mild heating, that is, at about 25–40° C. The product remaining as residue may be purified if desired, for example, by washing with concentrated sodium hydroxide and then with ether. When the product is solid, it may be readily filtered, and washed several times with ether and cold water and then dried, as for example, in a vacuum oven. Where the product is non-solid, that is, a biscous fluid mass, ether is vacuumed off and the product is heated to remove undesirables such as low boiling carbonates, unreacted materials, and any remaining solvent.

Examples of the alkylene glycol bis(halophenyl carbonates) obtained as products using the alkylene glycol bis(chloroformate) compounds as reactants are as follows: 1,2-ethylene glycol bis(4-chlorophenyl carbonate), 1,2-propylene glycol bis(2,4-dichlorophenyl carbonate), 1,3-propylene glycol bis(2,4,5 - trichlorophenyl carbonate), 1,2-butylene glycol bis(pentachlorophenyl carbonate), 1,4-butylene glycol bis(2,4,5-trichlorophenyl carbonate) and 1,5-pentylene glycol bis(pentachlorophenyl carbonate).

Illustrative examples of alkylene-oxy-alkylene bis(chlorophenyl carbonates) obtained as products of the reaction using alkylene-oxy-alkylene bis(chloroformate) compounds as reactants are, for example, as follows: diethylene glycol bis(4-chlorophenyl carbonate), dipropylene glycol bis(2,4,5-trichlorophenyl carbonate), 3,3'-dibutylene glycol bis(tetrachlorophenyl carbonate), 4,4'-dibutylene glycol bis(pentachlorophenyl carbonate).

Similarly, when bis(chloroformate) compounds derived from polyalkylene-oxy-alkylene glycols and phosgene are reacted with the halophenol, respective polyalkylene-oxy-alkylene halophenol carbonates are produced, specific examples of which are: triethylene glycol bis(2,4,5-trichlorophenyl carbonate), tripropylene glycol bis(pentachlorophenyl carbonate), tributylene glycol bis(2,4-dichlorophenyl carbonate), tetraethylene glycol bis(tetrachlorophenyl carbonate), tetrapropylene glycol bis(pentachlorophenyl carbonate), tetrabutylene glycol bis(2,4-dichlorophenyl carbonate), pentaethylene glycol bis(2,4,5-trichlorophenyl carbonate), pentapropylene glycol bis(pentachlorophenyl carbonate), and pentabutylene glycol bis(2,4-dichlorophenyl carbonate).

Other examples of biscarbonates obtained from bis(chloroformates) derived from polyalkylene-oxy-alkylene glycols having from 6 to 10 alkylene groups therein are exemplified by the following: hexaethylene glycol bis(tetrachlorophenyl carbonate), heptabutylene glycol bis(pentachlorophenyl carbonate), nonaethylene glycol bis(2,4,5 - trichlorophenyl carbonate), and decapropylene glycol bis(tetrachlorophenyl carbonate).

In general, all of these compounds show biological activity to varying extents for varying purposes. In addition, these compounds can also be advantageously employed as plasticizers for many plastics and resins, as lubricants and lubricant additives and as flame retardant chemicals.

The advantages, desirability and usefulness of the new compounds of this invention are illustrated by the following examples.

*Example 1*

To a solution of 81.0 g. (0.41 mole) of 2,4,5-trichlorophenol in 600 ml. of pyridine, cooled in an ice bath to keep the temperature below 20° C. there was slowly added, while stirring, 38.3 g. (0.204 mole) of ethylene glycol bis(chloroformate). The mixture was stirred for 18 hours. The pyridine solvent was then removed under aspirator vacuum at 25 to 40° C. The residue was extracted with excess ether and washed with 1.5 N sodium hydroxide to remove any unreacted 2,4,5-trichlorophenol and with 3 N hydrochloric acid to remove any remaining pyridine. The ether solution of the product was then dried and distilled to remove excess ether. A precipitate of 46.7 g. of ethylene glycol bis(2,4,5-trichlorophenol carbonate) M.P., 107–108° C., was obtained.

*Example 2*

A solution of 83.0 g. (0.42 mole) of 2,4,5-trichlorophenol in 600 ml. of pyridine was reacted with 49.0 g. (0.2 mole) of diethylene glycol bis(chloroformate) according to the procedure described in Example 1. After washing an ether solution of the product with sodium hydroxide and then with hydrochloric acid, and drying off the excess ether as above, there was obtained as product, 39.2 g. of diethylene glycol bis(2,4,5-trichloropenyl carbonate), M.P., 119–120° C.

*Example 3*

The procedure of Example 1 was repeated except that 53.2 g. (0.2 mole) of pentachlorophenol in 600 ml. of pyridine was reacted with 27.5 (0.1 mole) of triethylene glycol bis(chloroformate). The reaction mixture was washed with ether. The ether extract of the product was washed with 1.5 N sodium hydroxide and 3 N hydrochloric acid as above. Upon stripping off the ether under vacuum, up to 185° C./0.6 mm. there was obtained 59.1 g. of a white solid precipitate, triethylene glycol bis(pentachlorophenyl carbonate), M.P., 134-135° C., which was analyzed as containing 47.42% chlorine as compared to a calculated value of 48.24% chlorine.

*Example 4*

A solution of 5.2 g. (0.05 mole) of 1,5-pentane-diol and 32.8 g. (0.1 mole) of pentachlorophenyl chloroformate in pyridine was mixed for 16 hours at ice bath temperatures. The excess pyridine solvent was removed under vacuum with mild treating, and then the residue was treated with aqueous 3 N sodium hydroxide and then washed with ether. An insoluble precipitate, and the aqueous phase were separated and discarded. The ether solution of the product was washed again with aqueous sodium hydroxide and after separating the aqueous phase, the ether solvent was volatilized off under vacuum, leaving 6.2 g. of 1,5-pentylene glycol bis(pentachlorophenyl carbonate), M.P. 325–326° C.

*Example 5*

In this example, ethylene glycol bis(2,4,5-trichlorophenyl carbonate) and diethylene glycol bis(2,4,5-trichlorophenyl carbonate) were evaluated as soil fungicides against soil born pathogens. One pound of soil infested with damping-off fungi, Rhizoctonia solani, Sclerotium rolfsii, Fusarium lycopersici, Verticillium albo-atrum, and Pythium sp. was placed in a Mason jar and a 5 ml. portion of a 1% acetone solution of the candidate chemical added to give an application rate of 100 p.p.m. The jar was then sealed and the contents thoroughly mixed by vigorous shaking. The treated soil was incubated at room temperature for 24 hours and then transferred to 4 inch clay pots within which were planted 5 seeds of each cotton and cucumber. The seeded pots were incubated at 70° F. and 98% relative humidity for 24 hours. The pots were then transferred to a greenhouse where these disease assessments were made 10 to 14 days later. At the end of this time, it was found that 18 to 20 out of a possible 20 plants were growing in the pot which had been treated with ethylene glycol bis(2,4,5-trichlorophenyl carbonate). In the pot treated with diethylene glycol bis(2,4,5-trichlorophenyl carbonate), 15 to 17 healthy plants out of a possible 20 plants had developed.

*Example 6*

In this example, ethylene glycol bis(2,4,5-trichlorophenyl carbonate) and diethylene glycol bis(2,4,5-trichlorophenyl carbonate) were tested against *Staphylococcus aureus* and *Salmonella typhosa*. A 1% stock solution of the compound in a non-toxic solvent was added to nutrient agar to give test samples containing 1 part of the compound per 100 parts of the agar. Petri dishes were filled with the test mixtures and the plates thus prepared were then respectively inoculated with said *Staphylococcus aureus* and said *Salmonella typhosa* organisms and incubated for two days at a temperature of 37° C. At the end of that time, inspection of the plates showed complete inhibition of growth of both organisms, while plates not containing the test compounds but otherwise identical and incubated similarly, showed normal uninhibited growth.

*Example 7*

In this example, diethylene glycol bis(2,4,5-trichlorophenyl carbonate) was tested against the fungus *Aspergillus niger* employing the following test procedure. A 1% stock solution of the compound in a non-toxic solvent was made up and this solution was added to sterile, melted dextrose agar in a quantity to give 1 part of the compound per 1000 parts of agar. After thorough mixing, the agar was poured into Petri dishes and allowed to harden. One drop of a spore suspension of the fungus was applied as inoculant for each plate. The inoculated plates were incubated at a temperature of 25° C. for 5 days. At the end of that time, inspection of the dishes showed complete inhibition of the growth of the test fungus, while plates not containing the said compound, but otherwise identical and incubated similarly showed normal uninhibited growth.

*Example 8*

For this example, 1,5-pentane bis(pentachlorophenyl carbonate) was tested against *Staphylococcus aureus*. A 1% stock solution of the compound in a non-toxic solvent was added to nutrient agar to give test samples containing 1 part of the compound per 1 million parts of the agar. Petri dishes were filled with the test mixtures and the plates thus prepared were then inoculated with said *Staphylococcus aureus* and incubated for two days at a temperature of 37° C. At the end of that time, inspection of the plates showed complete inhibition of growth of the test organism, while plates not containing the test compound, but otherwise identical, and incubated similarly, showed normal uninhibited growth.

The pesticidal compositions of this invention can be either liquids or dusts containing the new compounds of this invention admixed with suitable liquid or finely divided solid adjuvant carriers. These liquid and dust compositions can also contain, in addition to the regular adjuvants other additaments, such as fertilizers, for particular applications.

Liquid compositions containing the desired amount of these novel biscarbonate compounds can be prepared by dissolving them in an organic solvent, such as dioxane, diethyl carbitol, or tetrahydrofuran. Although these bis(halophenol-carbonate) compound toxicants are substantially insoluble in water, liquid compositions can be made by dispersing a finely divided compound in water using a suitable dispersing agent. Also, if desired, liquid compositions can be formed by dispersing the organic liquid composition containing the dissolved bis(halophenol carbonate) in water solutions to form an emulsion with the aid of a suitable dispersing and emulsifying agent. Dispersing agents employed in these compositions are oil soluble and include non-ionic emulsifiers such as the condensation products of alkylene oxide with phenols and organic acids, polyoxy ethylene derivatives of sorbitan esters, complexed ether alcohols and the like. Ordinarily, the concentration of the bis(halophenyl carbonate) toxicant in the liquid composition will comprise from 1–95% by weight of the total composition.

In dust compositions, the bis(halophenol carbonate) toxicant is dispersed in finely divided solid materials such as talc, chalk, gypsum, fuller's earth, clay and the like. The concentration of the toxicant in the dust composition can vary over wide ranges and preferably comprises from 5 to 95% by weight of the total composition.

The pesticidal compositions of this invention are applied to the situs of the pest in the conventional manner well known to those skilled in the art. Thus, where the compositions are to be applied to the foliage of growing plants, dust or liquid compositions are applied by the use of power dusters, hand sprayers, and spray dusters. The exact dosage of toxicant to be applied depends to a substantial extent upon the nature of the pest to be controlled and their environment. Suitable dosages can be readily determined by those skilled in the art from the examples given herein.

Reasonable variation and modification of the invention as described are possible, the essence of which is that there have been provided (1) biscarbonates of chlorinated phenols as new compounds, (2) methods for preparing said compounds by reaction of glycol bis(chloroformate) with a chlorinated phenol in an apppropriate solvent, (3) biological toxicant compositions containing at least one of said compounds as the essential active ingredient, and (4) methods for controlling biological pests by the application of said biological toxicant compositions.

We claim:

1. A compound of the formula

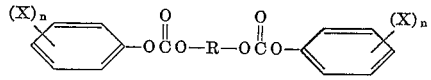

wherein X is a chlorine, $n$ is a whole number of from 1 to 5, and R is a bivalent radical selected from the group consisting of alkylene radicals having from 2 to 6 carbon atoms, -alkylene-oxy-alkylene- radicals having from 2 to 4 carbon atoms in each alkylene group, and polyalkylene-oxy-alkylene radicals having from 3 to 10 alkylene groups and from 2 to 4 carbon atoms in each alkylene group.

2. A compound according to the formula of claim 1 wherein X is chlorine, $n$ is 1, and R is ethylene.

3. A compound having the formula

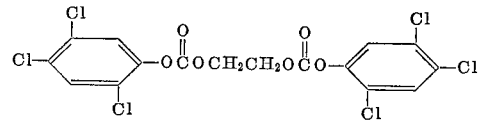

4. A compound having the formula

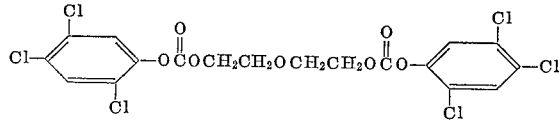

5. A compound having the formula
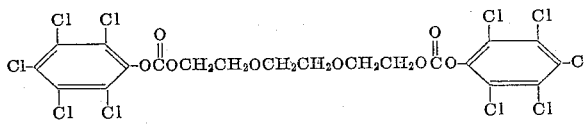
6. A compound according to the formula of claim 1 wherein X is chlorine, $n$ is 1, and R is pentylene.
7. 1,5-pentylene glycol bis(pentachlorophenyl carbonate).
References Cited in the file of this patent
UNITED STATES PATENTS
| | | |
|---|---|---|
| 2,370,571 | Muskat et al. | Feb. 27, 1945 |
| 2,384,143 | Strain et al. | Sept. 4, 1945 |
| 2,711,977 | Trieschmann et al. | June 28, 1955 |
| 2,789,968 | Reynolds et al. | Apr. 23, 1957 |
| 2,821,539 | Newman et al. | Jan. 28, 1958 |
| 2,873,291 | Spiegler | Feb. 10, 1959 |
| 2,992,159 | Kahn et al. | July 11, 1961 |
| 2,992,966 | Jacobi et al. | July 18, 1961 |